(12) United States Patent
Hicks (10) Patent No.: US 6,615,184 B1
(45) Date of Patent: Sep. 2, 2003

(54) SYSTEM AND METHOD FOR PROVIDING CUSTOMERS SEEKING A PRODUCT OR SERVICE AT A SPECIFIED DISCOUNT IN A SPECIFIED GEOGRAPHIC AREA WITH INFORMATION AS TO SUPPLIERS OFFERING THE SAME

(76) Inventor: Mitzi Hicks, 19742 Burle Oaks Ct., Humble, TX (US) 77346

( * ) Notice: Subject to any disclaimer, the term of this patent is extended or adjusted under 35 U.S.C. 154(b) by 0 days.

(21) Appl. No.: 09/477,441

(22) Filed: Jan. 4, 2000

(51) Int. Cl.$^7$ .............................................. G60F 17/60
(52) U.S. Cl. ...................................................... 705/26
(58) Field of Search .......................................... 705/26

(56) References Cited

U.S. PATENT DOCUMENTS

| | | | | |
|---|---|---|---|---|
| 5,710,887 A | * | 1/1998 | Chelliah et al. | 395/226 |
| 5,758,327 A | * | 5/1998 | Gardner et al. | 705/26 |
| 6,101,484 A | * | 8/2000 | Halbert et al. | 705/26 |

FOREIGN PATENT DOCUMENTS

| WO | WO 98/15907 | * | 4/1998 |
|---|---|---|---|

OTHER PUBLICATIONS

"Welcome to my parlor . . . " by Bruce H. Clark, Marketing Management, v5n4, pp. 10–25, Winter 1997.*

* cited by examiner

*Primary Examiner*—Kenneth R. Rice (57) ABSTRACT

A server receives supplier information from a supplier including a product/service that the supplier is offering along with a discount for the product/service. The supplier information further includes geographic locations where a customer can physically purchase the product/service, the sale dates, and supplier contact information. The supplier information is stored by the server in a database. The server also receives customer information from a customer including a product/service that the customer wishes to purchase along with a minimum discount that the customer desires for the product/service. The server searches the database for a matching supplier which has supplier information matching the customer information. The server then sends the customer the supplier contact information corresponding to the matching supplier.

18 Claims, 6 Drawing Sheets

SUPPLIER ENTRY PAGE

PLEASE ENTER YOUR BUSINESS NAME AND CONTACT INFORMATION:

54 ______________
______________
______________

PLEASE ENTER THE PRODUCT OR SERVICE FOR WHICH YOU ARE OFFERING A DISCOUNT (BE VERY SPECIFIC AND ENTER ALTERNATIVE DESCRIPTIONS):

56 ______________
______________
______________

58 PLEASE ENTER THE AMOUNT OF THE DISCOUNT:
______________

60 PLEASE ENTER ALL PHYSICAL LOCATIONS WHERE THE PRODUCT/SERVICE CAN BE OFFERED AT THE DISCOUNT:
______________

62 PLEASE ENTER THE SALE DATES FOR WHEN THE PRODUCT/SERVICE IS BEING OFFERED AT THAT DISCOUNT:
______________

64 DO YOU HAVE ANY OTHER DISCOUNTED PRODUCTS/SERVICES?
______________

66 ENTER OR SUBMIT INFORMATION TO BE DISPLAYED TO A CUSTOMER:
______________

68 ENTER BILLING INFORMATION:
______________            [Continue] [Add] [Cancel]
                                            70

Fig. 3

|  | I | II | III | IV | V |
|---|---|---|---|---|---|
|  | Sale Dates | Geographic locations | Products/services | Discount | Supplier Information |
|  | 11/10-11/10 | 10010 | Nike shoes | 15% | BOB'S |
|  | ⋮ | | | | |
|  | 11/15-11/21 | 10036 | cameras | 10% | THE WIZ |
|  | 11/15-11/21 | 10036 | Nike shoes | 25% | John's Sports |
| 86 — | 11/15-11/21 | 10036 | Nike shoes | 35% | MACY'S |
| 88 — | 11/15-11/21 | 10036 | Nike shoes | 30% | STERN'S |
|  | 11/15-11/21 | 10036 | washing machines | 40% | SEARS |
|  | ⋮ | | | | |

CUSTOMER ENTRY PAGE

72 — PLEASE ENTER YOUR NAME (OPTIONAL):
___________

74 — PLEASE ENTER YOUR ADDRESS (OPTIONAL):
___________
___________

76 — WHAT PRODUCT/SERVICE WOULD LIKE TO SAVE MONEY ON (BE AS SPECIFIC AS POSSIBLE, e.g. NIKE SHOES):
___________

78 — ENTER THE MINIMUM DISCOUNT (OFF OF RETAIL PRICES) WHICH YOU DESIRE FOR THE ENTERED PRODUCT/SERVICE?
___________

80 — ENTER THE ZIP CODES OF CITIES WHICH YOU ARE WILLING TO TRAVEL TO PURCHASE THE ENTERED PRODUCT/SERVICE (ENTER "ALL" IF DO NOT CARE OR YOU WISH TO HAVE THE PRODUCT/SERVICE SHIPPED TO YOU)
___________

82 — PLEASE ENTER YOU E-MAIL ADDRESS SO THAT WE MAY INFORM YOU OF FUTURE SALES SATISFYING YOUR CRITERIA:
___________

84 — WHEN ALL INFORMATION IS ENTERED, CLICK ON THE "FIND THAT SALE" BUTTON:

86 — [FIND THAT SALE]    [CANCEL] — 88

Fig. 5

SALE SEARCH RESULTS

The following suppliers satisfied all of your criteria:

| Supplier | Product/ service | Sale dates | Discount | Phone | Address | E-mail | Takes Credit cards? | Fax | Mail order information | Phone order information |
|---|---|---|---|---|---|---|---|---|---|---|
| Macy's | Nike shoes | 11/15 - 11/21 | 35% | : | : | : | : | | | |
| Stern's | Nike shoes | 11-15 - 11/21 | 30% | : | : | | | | | |
| | | | | | | | | | | |

Click on a supplier to see map information

Fig. 6

SYSTEM AND METHOD FOR PROVIDING CUSTOMERS SEEKING A PRODUCT OR SERVICE AT A SPECIFIED DISCOUNT IN A SPECIFIED GEOGRAPHIC AREA WITH INFORMATION AS TO SUPPLIERS OFFERING THE SAME

BACKGROUND OF THE INVENTION

The invention relates to a searching method and system, and more particularly to a method and system for providing customers searching for a minimum discount off the price of a product or service in a geographic area specified by the customer, with information as to a store or service provider which is offering the product or service at such a discount in that geographic area.

When a customer desires to purchase a product or service, frequently the customer will investigate different forms of advertisement media in order to ascertain a supplier of the product or service (hereinafter generally referred to as just a "supplier") offering the best price or for a minimum discount off the retail or wholesale price. Such investigation may take the form of, for example, reviewing newspapers for specific advertisements from suppliers, calling individual suppliers, searching Internet web sites, physically visiting a plurality of suppliers, etc.

The investigation clearly can take a considerable amount of time and effort for the customer. Moreover, typical advertising media, like newspaper inserts, sort the advertisements by the supplier and not by the product and discount first. For example, a single supplier of products (e.g. Macy's) will typically list the products they have on sale in one circular. The customer must then search through each circular from each supplier to find the one product that the customer is interested in, and then determine whether that product is being offered at a discount desired by the customer.

Thus, prior art advertisements force the customer to first look through supplier's advertisements and then for the product or service and discount. Sorting by product or service and discount first would save the customer a considerable amount of time. The customer knows the product or service and a desired discount, and desires to find a corresponding supplier of the product or service. Moreover, the customer would also save time if he or she could access an advertising medium which already has discounted products and services. In such a case, one criterion, that of obtaining a discount, is immediately satisfied (assuming that the customer requests, and this new advertising medium offers, a similar discount rate). However, the prior art is devoid of such functionality.

Further, there are frequently instances where a customer is interested in purchasing a product or service but can wait for the product/service to go on sale at a desired discount. Such a customer merely wishes to learn of a supplier which can provide the product or service at some desired discount rate and may wish to wait until such a supplier is available. Additionally, many customers wish to limit their searches to a specific geographic area so that the customer does not have to travel far beyond their residence.

Conversely, suppliers need to advertise their products or services as well as possible discounts on these products or services to try to reach perspective customers. Customers have access to these advertisements through the media mentioned above (i.e. newspapers, web sites, etc.). Suppliers also must invest a large amount of time and money in creating and disseminating the advertising media with respect to their products and services. An advertising agency may have to be employed which produces a further expense for the supplier. Further, suppliers have no avenue for targeting customers who are looking for specific sales on products or services which are being offered by the supplier. For example, a supplier offering a discount on a product/service may advertise that discount in one of the media mentioned above which may never reach the intended customer who desires that product/service (at the discount offered by the supplier). The production of the advertising media could also be very costly. The cost may be prohibitive for small businesses.

One prior art technique for matching customers and suppliers, like that shown in U.S. Pat. No. 5,742,931 to Spiegelhoff et al., allows a customer to search a plurality of warehouses to find the warehouse offering a product at the lowest price. The warehouses each send product and price information to a resource allocation system which in turn compares and correlates this information for a customer. The customer then has the opportunity to order from the warehouse offering the lowest cost per unit item. However, in Spiegelhoff, the customer must make a purchase and desires to find to the most inexpensive approach. Also, the customer has no opportunity to narrow down the search by specifying a minimum discount that the customer desires for the product or to define a geographic area to which the customer is willing to travel.

Spiegelhoff thus does not accommodate customers who desire to purchase a product only if the product satisfies certain criteria relating to discounted price and geographic availability.

U.S. Pat. No. 5,873,069 to Ruehl et al. discloses a system which finds the lowest price for a particular product within a predetermined market. Again, there is no function for providing a customer seeking a specific discount for a product/service with information as to a supplier offering such a discount. Nor does Ruehl et al. provide for limiting the search to a geographic criteria.

Another prior art technique disclosed in U.S. Pat. No. 5,946,655 to Suzuki et al. provides shopping information for a customer. A customer can enter products which the customer wishes to purchase and the system will indicate stores which sell those products. However, like the prior art discussed above, there is no opportunity for a customer to search for suppliers offering the product at a desired discount nor search within a specified geographic area.

Thus, there exists a need in the art for a method or system which can provide customers who seek a product or service at a specified discount in a desired geographic area with information relating to suppliers which are offering such a product or service at the specified discount in the desired geographic area.

SUMMARY OF THE INVENTION

One aspect of the invention is a method of matching a customer and a supplier. The method comprises the acts of receiving supplier information from at least one supplier, the supplier information including a supplier product/service, a supplier discount for the supplier product/service, and supplier contact information. The method further comprises receiving customer information from the customer, the customer information including a customer product/service; finding a matching supplier, from the at least one supplier, the matching supplier offering a matching supplier discount for the customer product/service, the matching supplier discount being at least a minimum discount. The method still further comprises sending the supplier contact information corresponding to the matching supplier to the customer.

In one distinctive feature of this first aspect of the invention, the act of receiving supplier information further includes receiving supplier geographic information indicating where the supplier product/service can be purchased. The act of receiving customer information further includes receiving customer geographic information indicating where the customer is willing to purchase the customer product/service. The matching act further includes matching a supplier whose supplier geographic information at least partially matches the customer geographic information.

Another aspect of the invention is system for matching a customer with a supplier. The system comprises a server coupled to a network and a supplier terminal, the supplier terminal sends supplier information relating to at least one supplier across the network to the server. The supplier information includes a supplier product/service, a supplier discount at which the supplier is offering the product/service, and supplier contact information. The system further comprises a customer terminal, the customer terminal sends customer information across the network to the server, the customer information including a customer product/service. The server receives the supplier information and the customer information and finds a matching supplier of the at least one supplier, the matching supplier offering a matching supplier discount for the customer product/service, the matching supplier discount being at least a minimum discount. The server sends the supplier contact information corresponding to the matching supplier to the customer terminal.

Yet another aspect of the invention is a server in communication with at least one customer terminal and at least one supplier terminal across a communication network, the server matching a customer using the at least one customer terminal and at least one supplier. The server comprises a storage device storing server software and a database, a network interface facilitating the communication, and a processor executing software code enabling the server to perform the function of receiving supplier information from the supplier including a supplier product/service, a supplier discount for the product/service, and supplier contact information. The processor further executes software which enables the server to perform the functions of receiving customer information from the customer including a customer product/service; finding a matching supplier from the at least one supplier, the matching supplier offering a matching supplier discount for the customer product/service, the matching supplier discount being at least a minimum discount; and sending the supplier contact information corresponding to the matching supplier to the customer terminal.

Still another aspect of the invention is a computer readable storage medium storing information relating to a discount for a product/service offered by a supplier. The computer readable storage medium storing data comprising a first field including product/service data comprising the product/service offered by the supplier; a second field including discount data; and a third field including supplier contact information of the supplier.

Yet still another aspect of the invention is a method for determining a supplier of a product/service offering the product/service at a desired discount. The method comprising the acts of searching a database for the desired product/service; searching the database for the desired discount for the desired product; and after the acts of searching, determining the supplier which offers the desired product/service at a supplier discount, the supplier discount being at least the desired discount.

Still yet another aspect of the invention is a method of matching a customer with a supplier. The method comprising the act of receiving supplier information from at least one supplier including a supplier product/service, a supplier geographic area where the supplier is offering the supplier product/service, and supplier contact information. The method further comprises the acts of receiving customer information from a customer, the customer information including a customer product/service and a customer geographic area where the customer is willing to purchase the product/service; finding a matching supplier, from the at least one supplier, the matching supplier being one of the at least one supplier which offers the customer product/service in the customer geographic area; and sending the supplier contact information corresponding to the matching supplier to the customer.

These aspects, as well as others, will become apparent upon reading the following disclosure and corresponding drawings.

BRIEF DESCRIPTION OF THE DRAWINGS

For the purpose of illustrating the invention, there is shown in the drawings a form which is presently preferred, it being understood, however, that the invention is not limited to the precise arrangements and instrumentalities shown.

DETAILED DESCRIPTION OF THE INVENTION

As used herein, the term "supplier" is used to designate a store or service provider which provides a respective product or service to a customer. The terms product and service are used interchangeably herein and are generally referred to hereinafter as "product/service" to improve clarity and to avoid obfuscating the invention.

Figure 1:
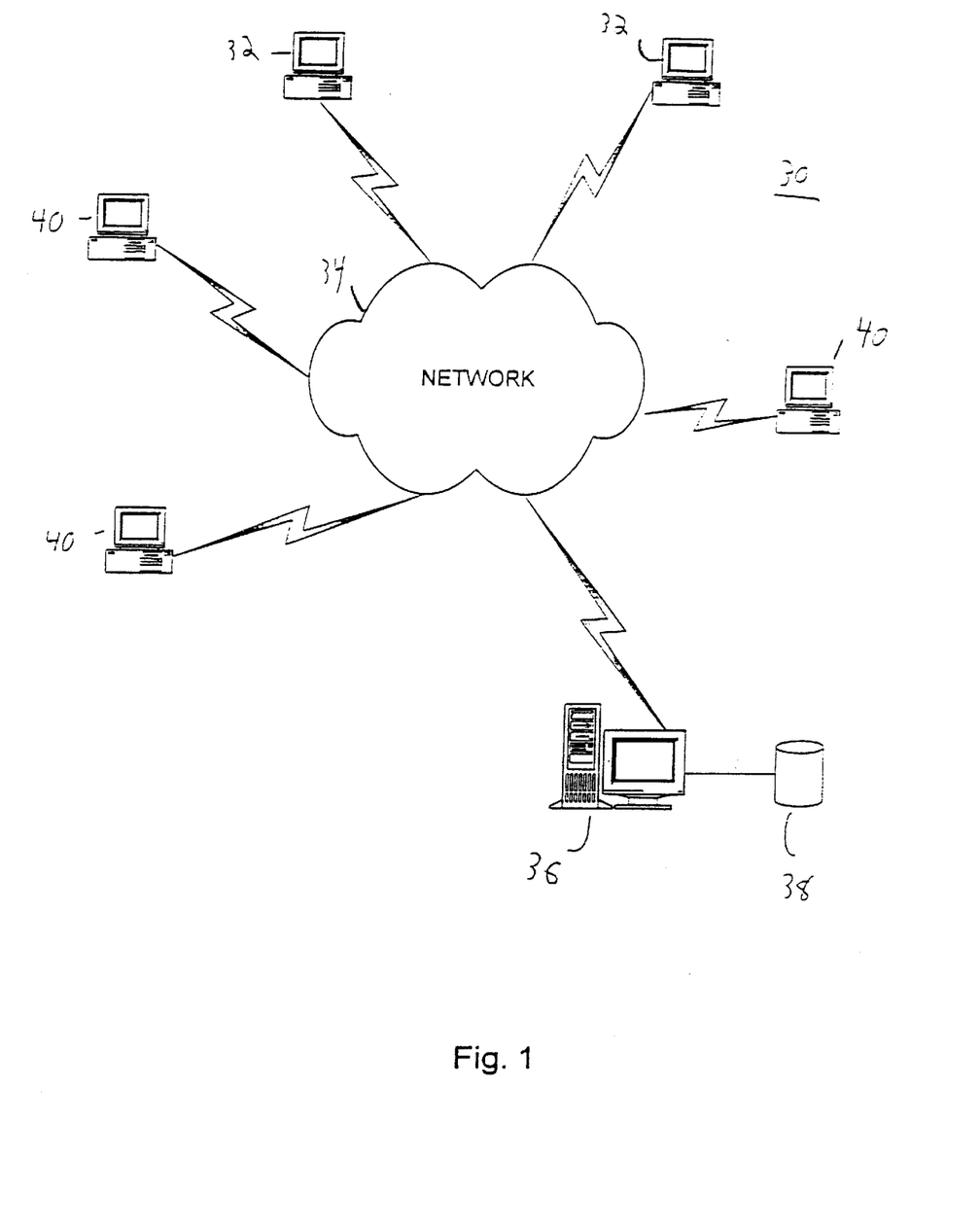
FIG. 1 is a diagram of a system of the present invention.

Referring now to the drawings in which like reference numerals refer to like elements, there is shown in FIG. 1 a diagram of an example of a system 30 used in accordance with the invention. One or more customer terminals 32 allow customers to enter and send queries through a communication network 34 to a system server 36. Similarly, one or more supplier terminals 40 allow suppliers to enter information through communication network 34 to system server 36. Communication network 34 can be any communication network, including a network which is capable of facilitating wireless and cellular network communication, including, but not limited to, the Internet. Software which can be used with the present invention is stored and executed on system server 36. System server 36 can use any suitable query method and database engine for matching the customer with a corresponding supplier. For example, the database engine can be a relational database engine such as those offered by the ORACLE CORPORATION.

The software program of the invention for system server 36 can be created using, for example, one or a combination of C++, Java, Visual Basic, or any other contemporary programming language. System server 36 is coupled to a database 38 and network 34 so that system server 36 may send and receive information to and from both database 38 and other devices coupled to network 34. System server 36 directs customer terminal 32 to display supplier information stored on a supplier terminal 40 or in database 38. The operation of system 30 is discussed more fully below.

Figure 2:
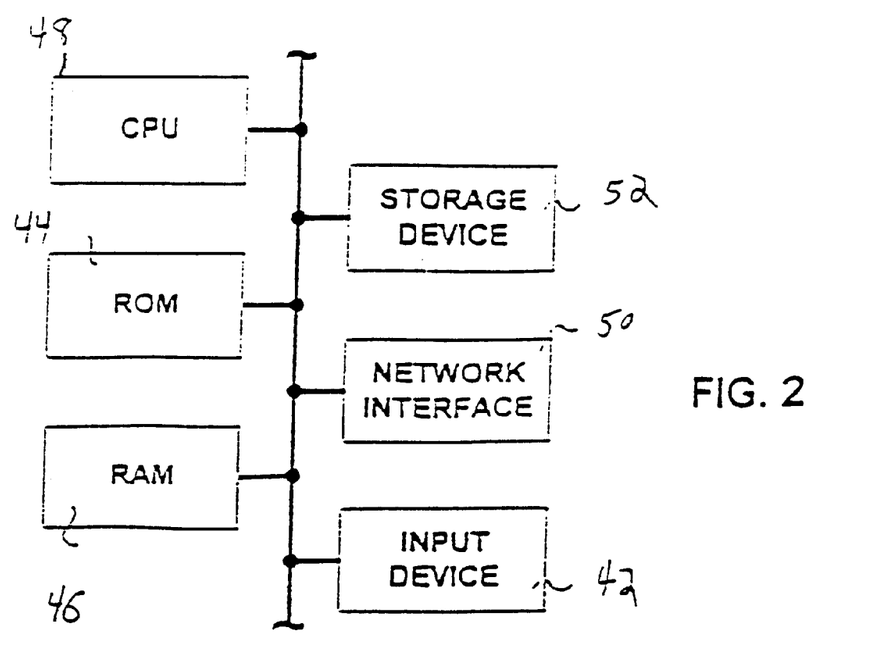
FIG. 2 is a block diagram of a system server, customer terminal, or supplier terminal used in accordance with the invention.

FIG. 2 shows an example of the hardware components of system server 36, customer terminal 32, and supplier terminal 40 as used in the present invention. Each of these elements preferably comprises one or more input devices 42, such as a keyboard and mouse, read only memory ("ROM") 44, random access memory ("RAM") 46, central processing unit ("CPU") 48, network interface 50 to transmit and receive data to and from other computer devices across network 34, and storage device 52 such as a hard disk drive, optical drive, tape drive, CD-ROM, DVD-ROM, etc. for storing software and other program code, databases and application data. The various components need not be physically contained within the same chassis or even located at a single location. For example, in system server 36, database 38 can reside on storage device 52, but storage device 52 may be located at a site which is remote from the remaining elements of system server 36, and may even be connected to CPU 48 across communication network 34 via network interface 50.

Customer terminals 32 and supplier terminals 40 may be INTEL PENTIUM-based personal computers with functional components similar to those discussed above with respect to system server 36. However, the specific components 40–48 (referenced in system server 36) are sized appropriately to a single user, i.e., smaller CPU 48, less RAM 46, etc. Also, customer terminal 32 and supplier terminal 40 preferably comprise a display (not shown explicitly) which is merely optional for system server 36. Other user terminals which can communicate over a global computer network such as palmtop computers, personal digital assistants ("PDAs") and mass marketed Internet access devices, i.e., WEBTV, can also be used in place of customer terminal 32 or supplier terminal 40. The term "customer terminal" and "supplier terminal" will be used throughout though it should be clear that any of the above referenced alternatives, as well as other alternatives known by those with ordinary skill in the art, are also meant to be included within the meaning of this term.

Customer terminals 32 and supplier terminals 40 have the ability to send and receive data across communication network 34, and the ability to display the received data on a display using appropriate communication software such as an Internet web browser. Web browser software includes, for example, NETSCAPE COMMUNICATOR or MICROSOFT INTERNET EXPLORER.

The connections between customer terminals 32 or supplier terminals 40 and communication network 34 can be any known arrangement for accessing a communication network, such as dial-up serial line interface protocol/point-to-point protocol ("SLIP/PPP"), Integrated Services Digital Network ("ISDN"), dedicated leased-line service, broad band (cable) access, Digital Subscriber Line ("DSL"), a synchronous transfer mode ("ATM") or other access techniques. Communications are preferably implemented using the Transmission Control Protocol/Internet Protocol (TCP/IP) but are not limited to such. Any data communication protocol which allows data to be communicated between system server 36 and terminals 32 and 40 can be used.

The invention matches customers with appropriate suppliers. Suppliers preferably enter information into database 38 relating to their products/services, respective discounts, sale dates and geographic locations where the products/services can be purchased. Customers use the invention by entering information relating to their desired product/service, discount and geographic locations. System server 36 will then match the customer to suppliers satisfying the customer's criteria.

Figure 3:
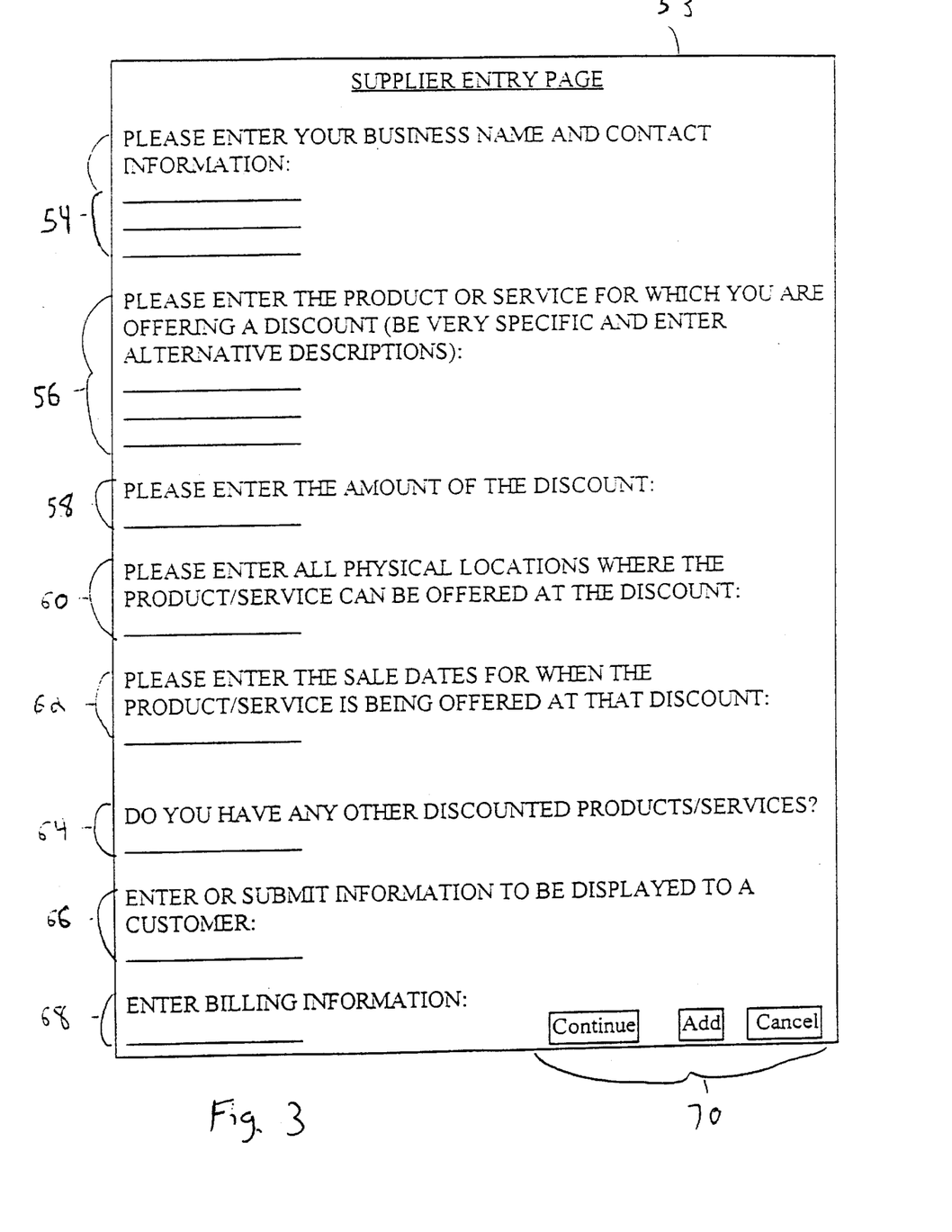
FIG. 3 is a diagram detailing the entry of supplier information into a database of the invention.

FIG. 3 is a diagram of a supplier entry page 53 reflecting the entry of a supplier's data into database 38 in accordance with the invention. The supplier will communicate with system server 36 by sending information from supplier terminal 40 through network 34 to system server 36. Upon connecting with system server 36, system server 36 causes supplier terminal 40 to display a prompt to enter the supplier name and contact information as is shown at business identification area 54. The supplier is prompted at product name entry area 56 to enter the product or service for which the supplier is offering a discount. The supplier is prompted to enter the magnitude of the discount for which the supplier is offering the entered product or service at discount magnitude entry area 58. The discount could be, for example, off retail or wholesale prices. The invention can also be designed to require a minimum discount in order for a supplier to register their product or service. For example, system 30 can be configured to require a minimum 30% discount such that if the supplier enters a discount that is below this minimum discount, the supplier will be informed that the discount is not sufficient to be eligible for registry in system server 36.

At geographic discount location entry area 60, the supplier is prompted to enter the geographic areas (i.e., zip codes or area codes) where the supplier has physical locations available to sell its products/services and is willing to discount the sale's price of the product/service. Multiple geographic areas can be entered by the supplier as system server 36 will match a supplier to a customer when the supplier's geographic information at least partially matches the customer's geographic information. Moreover, if the supplier does not have a physical location (i.e. an on-line supplier with no specific brick and mortar location) or if the supplier only ships goods, the supplier can omit the geographic area entry.

At sale date area 62, the supplier is prompted to enter the sale dates of the sale indicating both the start and end date for which the discount is applicable. At additional product query area 64, the supplier is queried as to whether additional products/services are being offered at discount prices. If additional products/services are being offered, the supplier selects the "Add" button shown at 70 and the invention branches back and again displays areas 56 to 64 for the supplier to enter any further products/services, the corresponding discounts, the physical locations where the products/services are available and the respective dates.

At supplier contact information prompt 66, the supplier is prompted to enter or submit the information which the supplier wishes a customer to see when the customer and the supplier are linked together (i.e. "supplier contact information"). This supplier contact information can include, for example, the supplier's name and address, the supplier's telephone number, a digitized photograph, e-mail address, a hyperlink to the supplier's web site, the discounted products/services, length of the sale, instructions how to place a phone or credit card order, shipping instructions, a map instructing a customer how to physically reach the supplier, etc. The supplier contact information is preferably stored in database 38 or in a supplier terminal 40 which can be accessed by system server 36 through network 34. Clearly, any other information conveyed by the supplier to the customer is within the scope of the invention. The supplier contact information is sent electronically from supplier terminal 40 through network 34 to system server 36. Alternatively, the supplier can physically send a recording medium containing the applicable information, or send the information by facsimile, written document, etc., to system server 36 to be stored therein. Thus, it should be clear that a supplier is not required to send information through network 34.

At billing information prompt 68, the supplier is prompted to enter billing information indicating how the supplier will pay for the use of the invention. As the supplier is receiving the benefit of advertising through the invention, the supplier can be requested to pay for the service. Generally the supplier will pay for the listing to be stored in database 38 for an agreed upon period of time. The supplier can pay, for example, a fixed rate for usage of the invention, a charge per customer request, a usage-based charge, a quantity discount based upon the number of listing by the supplier, etc. If the supplier pays for a defined period of time, once that period of time is nearing its end, system server 36 will send an e-mail or generate a reminder to be sent to the supplier for the supplier to renew its service. Alternatively, the supplier can have a prepaid account and a reminder is sent when the balance in the account falls below a predetermined amount or the supplier can choose to have the fees added to, for example, the supplier's phone bill. Clearly, other cost arrangements could be implemented. For example, each customer could be required to pay a nominal fee, a subscription charge, a per use charge, etc.

When all of the supplier's information has been entered, the supplier then selects the "Continue" button at 70. If the supplier decides not to have the information sent to system server 36, the supplier will select the "Cancel" button at 70. Although one supplier entry page is shown, the display screens can be configured such that the supplier information input is distributed across more than one display page.

Figure 4:
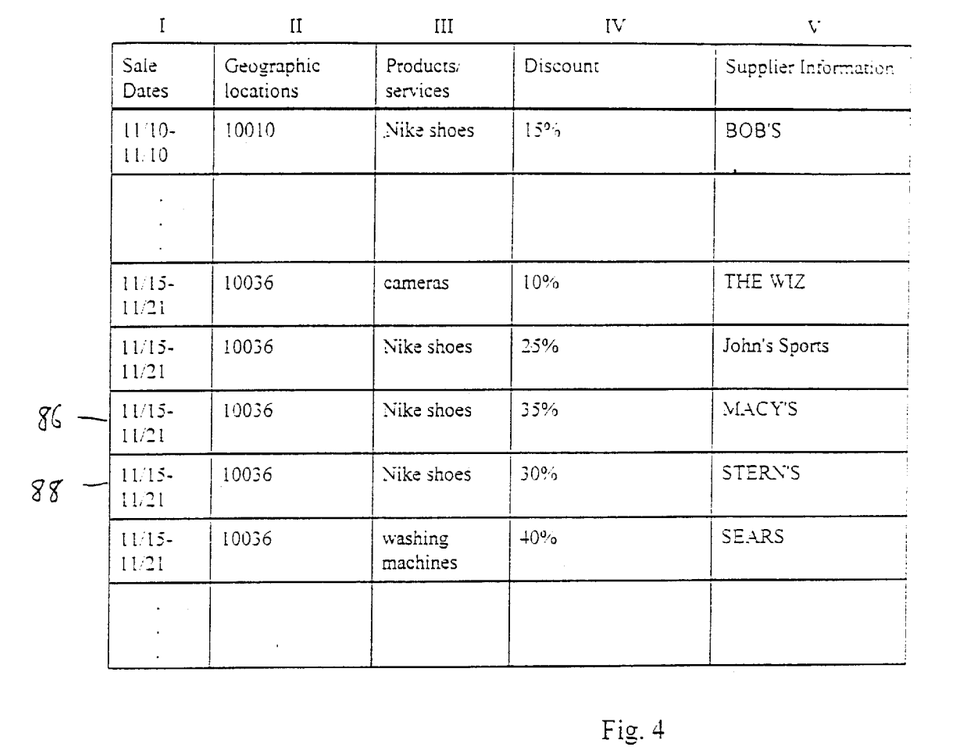
FIG. 4 is a diagram of a matching portion of a database used in accordance with the invention.

Referring now to FIG. 4, there is shown an example of a table of database 38 which can be used in the invention to store portions of the entered supplier information that are used to match customers and suppliers. As shown in FIG. 4, each record in the database table is preferably comprised of five fields of information (I–V) in the matching section of database 38. The sale dates entered in 62 (FIG. 3) are stored in Field I of the corresponding matching section record. The month and dates of the sale are shown in Field I but the year of the sale can be stored as well. In Field II, the geographic locations where the product/service can be physically purchased, as was entered at geographic discount location entry area 60, are stored. Field III includes a listing of the products/services entered at product name entry area 56. Field IV includes the discount for each product/service as was entered at discount magnitude area 58. Field V includes at least a reference to the supplier contact information furnished at supplier contact information prompt 66. This reference can be a pointer to a different location in database 38 where the supplier information is stored or it can be the entirety of the supplier information or a subset thereof. Field V only needs to include enough information so that the appropriate supplier's contact information can be determined.

Clearly, the information can be stored in any other convenient arrangement. For example, the matching portion of database 38 can have Fields I–V ordered differently or could include all of the information entered by the supplier. The matching portion shown in FIG. 4 is used when matching together a customer and a supplier as is described more completely below.

Figure 5:
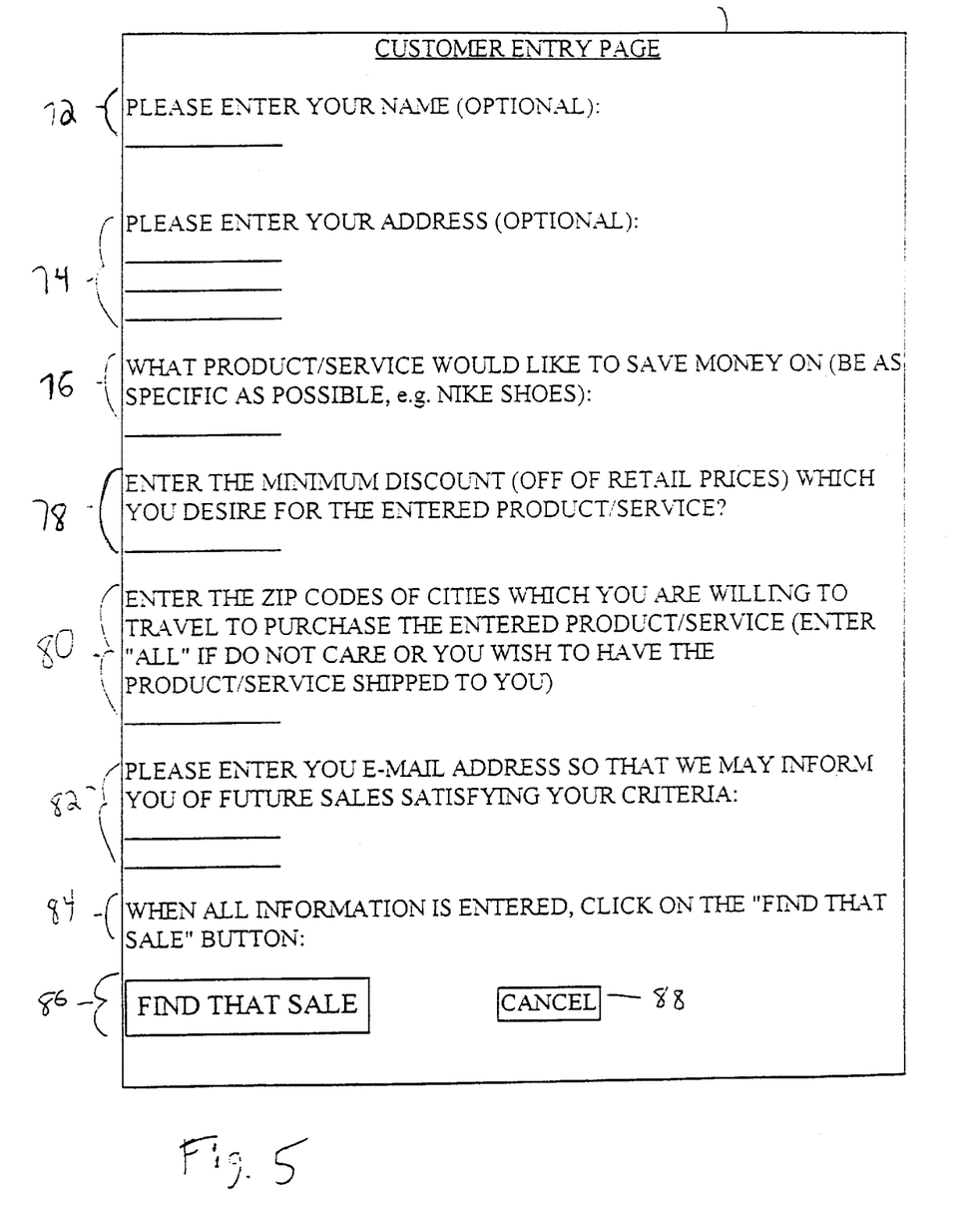
FIG. 5 is a diagram detailing the entry of customer information into a database of the invention.

FIG. 5 shows an example of a customer entry page 71 on customer terminal 32 for the request and entry of customer information in accordance with the invention. A customer accessing system server 36 connects to system server 36 via customer terminal 32 and through communication network 34. Upon connecting to system server 36, system server 36 preferably causes customer terminal 32 to prompt the customer to optionally enter the customer's name in customer name area 72 and address in customer address area 74. At customer product area 76, system server 36 prompts the customer to enter the product or service for which the customer is interested in purchasing.

At customer discount area 78, system server 36 prompts the customer to enter the minimum discount for which the customer wants as an incentive to purchase the product/service. The discount could again be, for example, off retail or wholesale prices. Alternatively, the entire system can be based on a set minimum discount (e.g. 30%). In such a case, the customer user is not prompted to enter a minimum discount as all items in the database are a minimum of 30% off their original (retail, wholesale, etc.) prices. At customer geographic area 80, system server 36 prompts the customer to optionally enter a geographic area where the customer is willing to travel to physically purchase the entered products/services. The geographic area can be, for example, a zip code, area code, town, county, distance from the customer, or any other known way of demarcating a geographic area. Alternatively, the customer may choose to search for suppliers which only exist on-line or which only ship their products/services and so do not have a brick and mortar location where a customer can purchase the products/service. In such a case, the customer may enter in customer geographic area 80, "ALL" for all geographic locations or "on-line" for suppliers which only have an on-line presence. As an alternative, the customer could be prompted to choose either on-line shopping, local shopping (as in choosing a geographic area) or both at the outset of the customer's entry.

If the customer desires to have the search periodically performed on future dates, the customer can enter at customer e-mail address area 82, an e-mail address or other contact information. System 30 will periodically run the query entered by the customer for an agreed upon period of time and will contact the customer, using the contact information, if a supplier satisfies the customer's criteria. When the customer has completed entering the appropriate information, in response to customer completion prompt 84, the customer will either select the "FIND THAT SALE" button 86 to cause system server 36 to provide the customer with information relating to a corresponding supplier or the "Cancel" button 88 to cancel the entries. If the customer pays for using the service provided by the invention, an additional customer billing entry area (not shown) can be added to customer entry page 71.

Referring again to FIG. 4 as an example, assume that on November $20^{th}$, a customer entered a geographic area (e.g.

zip code) of 10036 and is looking for NIKE shoes offered with at least a 30% discount. An appropriate database query is generated by system server 36 in accordance with the customer's entries in areas 76–80. For example, a SQL (structured query language) query can be implemented or a query based upon any other conventional query language can be used. Based on the query using the above referenced example, system server 36 searches Fields I–V of the matching portion of database 38 and retrieves records 86 and 88 as a result.

Figure 6:
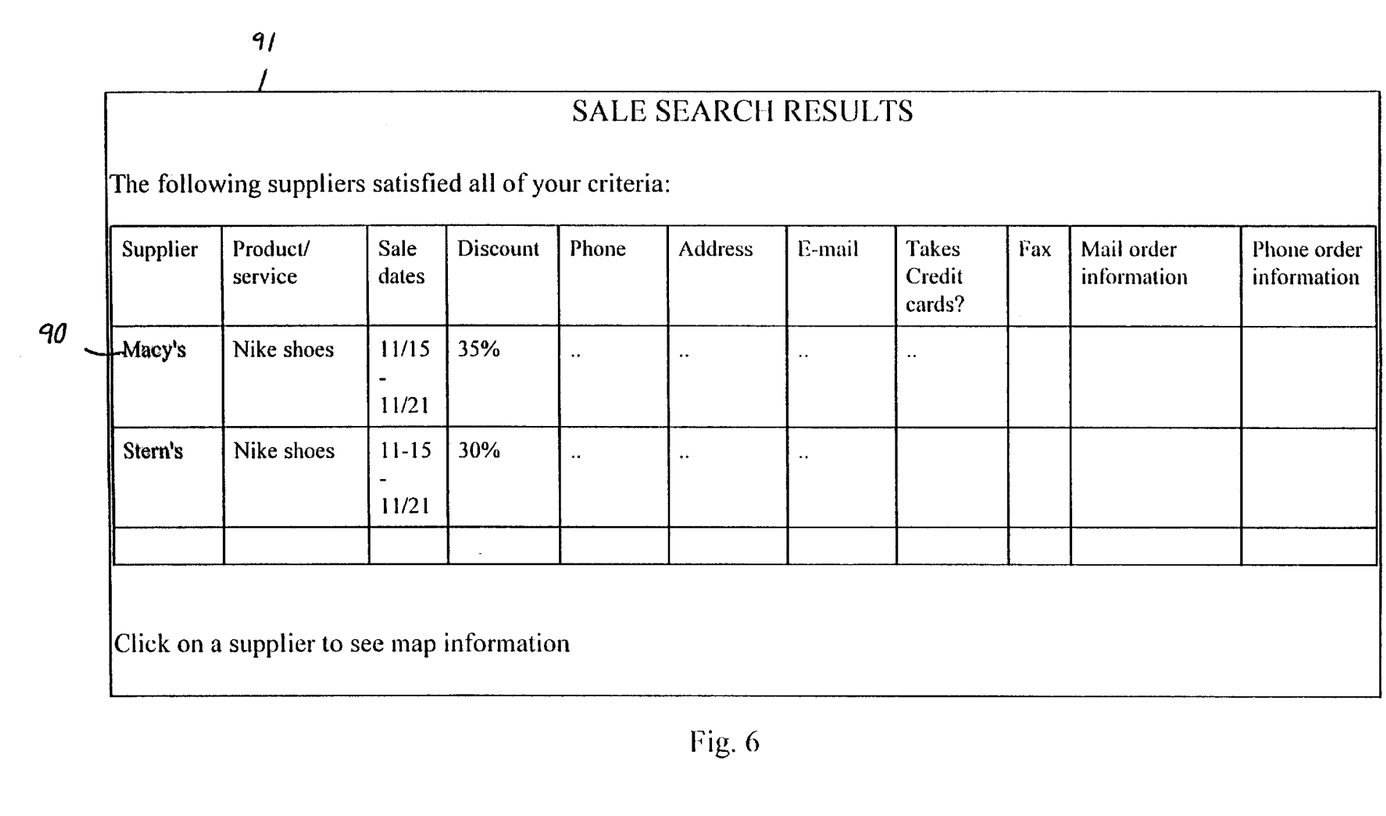
FIG. 6 is a diagram showing a sample search result achieved in accordance with the invention.

In the example, the suppliers MACY'S and STERN'S both satisfy all the criteria entered by the customer. The supplier information for these suppliers is then displayed to the user. This can be accomplished, for example, by displaying a list of the suppliers which satisfy the criteria along with typical supplier contact information. FIG. 6 shows a sale search result page 91 which is a display shown to a customer for the search example discussed above. System server 36 causes customer terminal 32 to display the supplier name, product/service, sale dates, etc. which relate to suppliers that match the customer's input criteria. With this information, the customer can then drive to the supplier, or order the product/service through any desired method which is available from the supplier—for example, phone orders, mails orders, on-line orders, a link to the supplier's web site with a discount code to receive the aforementioned discount, etc. The customer may also select the supplier's name in additional supplier information area 90, to receive more detailed information about the supplier including, for example, a map indicating how to travel to the supplier.

If no suppliers satisfy the customer's criteria, or if the customer wishes to be notified of future additional sales satisfying the customer's criteria, the customer is prompted to enter contact information, such as, for example, an e-mail address. System server 36 will then keep a record of the customer's query and will periodically run the query for an agreed upon period of time through database 38 to ascertain whether any suppliers satisfy the criteria. Such suppliers could enter their data after the customer has entered his data or the suppliers could have previously entered their data but the sales did not become effective until after the customer performed his search.

As would be understood by one skilled in the art, many other arrangements can be designed for database 38 which would still accommodate the invention. For example, database 38 is preferably automatically purged of data relating to sales which have passed. The ordering of the fields and the ordering of the search can easily be manipulated. Additional fields can be added or the referenced fields can be combined. The supplier information which is shown in field V can be merely a pointer to the supplier information stored elsewhere or field V could contain the entirety of the supplier information.

It should be noted that the supplier does not have to be a business which predominantly supplies a product/service. The supplier can also be an individual selling a single item or a plurality of items as in, for example, a garage sale. In such a case, a supplier entry page like that shown in FIG. 3 can still be used. The individual supplier will enter information relating to hours and dates of the garage sale, a phone number, address, etc. Customers can then search for a garage sale based upon the product they are interested in and the geographic location where they are willing to travel. The geographic location can be searched based upon zip codes, area codes, etc. The supplier can also furnish a map for a prospective customer to more easily locate the supplier. Alternatively, an arrangement could be made with a third party map provider, such as, for example, MAPQUEST, to provide a map detailing directions between the customer and the supplier.

Thus, by creating a database of suppliers who are offering a product or service at a specified discount, customers searching for a corresponding product or service with the same discount can be provided with information relating to respective suppliers. This offers customers fingertip comparison shopping in a particular geographic area. It saves the customer significant time in not having to search through newspaper ads, web sites, etc. to find a desired discount on an item or service in a specified geographic area. Customers also do not have to sift through advertisements which are not relevant to their specific needs. Suppliers enjoy an extremely lost cost way of reaching potential customers that are target specific. Additionally, suppliers can save time in advertising because the invention only requires a minimal amount of input information from a supplier.

As an alternative embodiment, an organizer of the system of the invention can make an arrangement with a third party (not necessarily related to the supplier of the product/service nor a customer) to search through other forms of advertising media and supply database 38 with data gleaned therefrom. In such a case, the supplier information still originates from the supplier but is entered into database 38 by the third party.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A method of matching a customer and a supplier, said method comprising the acts of:

receiving supplier information from at least one supplier, said supplier information including a supplier product/service, a supplier discount for said supplier product/service, and supplier contact information;

receiving customer information from said customer, said customer information including a customer product/service;

finding a matching supplier from said at least one supplier, said matching supplier offering a matching supplier discount for said customer product/service, said matching supplier discount being at least a minimum discount; and sending said supplier contact information corresponding to said matching supplier to said customer.

2. The method as claimed in claim 1, wherein:

said receiving said customer information occurs on a request date;

said receiving supplier information further includes receiving sale dates for when said supplier product/service is being offered at said supplier discount; and said supplier information of said matching supplier further has sale dates which include said request date.

3. The method as claimed in claim 1, further comprising the acts of:

storing said customer information; and repeating said finding a matching supplier act after a predetermined period of time.

4. The method as claimed in claim 1, wherein:

said act of receiving supplier information further includes receiving supplier geographic information indicating where said supplier product/service can be purchased;

said act of receiving customer information further includes receiving customer geographic information indicating where said customer is willing to purchase said customer product/service; and said matching act further includes matching a supplier whose supplier geographic information at least partially matches said customer geographic information.

5. The method as claimed in claim 1, wherein said customer information further includes said minimum discount.

6. The method as claimed in claim 1, wherein said receiving customer information act occurs before said receiving supplier information act.

7. The method as claimed in claim 1, wherein said receiving customer information act occurs both before and after said receiving supplier information act.

8. The method as claimed in claim 1, wherein said receiving supplier information act occurs before said receiving customer information act.

9. The method as claimed in claim 1, further comprising the act of linking together said customer terminal and said matching supplier terminal through a network.

10. A system for matching a customer with a supplier, said system comprising:

a server coupled to a network;

a supplier terminal, said supplier terminal sending supplier information relating to at least one supplier across said network to said server, said supplier information including a supplier product/service, a supplier discount at which said supplier is offering said product/service, and supplier contact information;

a customer terminal, said customer terminal sending customer information across said network to said server, said customer information including a customer product/service; wherein said server receives said supplier information and said customer information and finds a matching supplier of said at least one supplier, said matching supplier offering a matching supplier discount for said customer product/service, said matching supplier discount being at least a minimum discount; and said server sends said supplier contact information corresponding to said matching supplier to said customer terminal.

11. The system as claimed in claim 10, wherein:

said supplier information further includes supplier geographic information indicating where said supplier product/service can be purchased;

said customer information further includes customer geographic information indicating where said customer is willing to purchase said customer product/service; and said matching supplier has supplier geographic information that at least partially matches said customer geographic information.

12. The system as claimed in claim 10, wherein said server further links together said customer terminal and a matching supplier terminal corresponding to said matching supplier, through a network.

13. A server in communication with at least one customer terminal and at least one supplier terminal across a communication network, said server matching a customer using said at least one customer terminal with at least one supplier, said server comprising:

a storage device storing server software and a database;

a network interface facilitating said communication;

a processor executing software code enabling said server to perform the functions of:

receiving supplier information from said at least one supplier, to said supplier information including a supplier product/service, a supplier discount for said product/service, and supplier contact information;

receiving customer information from said customer, said customer information including a customer product/service;

finding a matching supplier from said at least one supplier, said matching supplier offering a matching supplier discount for said customer product/service, said matching supplier discount being at least a minimum discount; and sending said supplier contact information corresponding to said matching supplier to said customer terminal.

14. The system as claimed in claim 13, wherein:

said supplier information further includes receiving supplier geographic information indicating where said supplier product/service can be purchased;

said customer information further includes receiving customer geographic information indicating where said customer is willing to purchase said customer product/service; and said matching further includes matching a supplier whose supplier geographic information at least partially matches said customer geographic information.

15. A method for determining a supplier of a product/service offering said product/service at a desired discount, said method comprising the acts of:

searching a database for said desired product/service;

searching said database for said desired discount for said desired product; and after said acts of searching, determining said supplier which offers said desired product/service at a supplier discount, said supplier discount being at least said desired discount.

16. The method as claimed in claim 15, wherein said searching said database for said desired discount occurs before said searching a database for said desired product/service.

17. The method as claimed in claim 15, wherein said searching a database for said desired product/service occurs before said searching said database for said desired discount for said desired product.

18. The method as claimed in claim 15, further comprising, before said act of determining, searching said database for a desired geographic location where said product/service is offered by said supplier.

* * * * *